United States Patent
Zhu et al.

(10) Patent No.: US 10,585,173 B1
(45) Date of Patent: Mar. 10, 2020

(54) SYSTEMS AND METHODS FOR ENHANCED TOF RESOLUTION

(71) Applicant: Shenzhen Guangjian Technology Co., Ltd., Shenzhen, Guangdong (CN)

(72) Inventors: Li Zhu, Shenzhen (CN); Fanglu Lyu, Shenzhen (CN); Bo Wang, Shenzhen (CN)

(73) Assignee: Shenzhen Guangjian Technology Co., Ltd., Shenzhen (CN)

(*) Notice: Subject to any disclaimer, the term of this patent is extended or adjusted under 35 U.S.C. 154(b) by 0 days.

(21) Appl. No.: 16/378,965

(22) Filed: Apr. 9, 2019

Related U.S. Application Data (63) Continuation-in-part of application No. 16/268,493, filed on Feb. 5, 2019, which is a continuation-in-part of application No. 16/259,812, filed on Jan. 28, 2019.

(30) Foreign Application Priority Data

| Jan. 15, 2019 | (CN) | 2019 1 0035662 |
| Jan. 25, 2019 | (CN) | 2019 1 0073808 |
| Mar. 21, 2019 | (CN) | 2019 1 0215970 |
| Mar. 21, 2019 | (CN) | 2019 1 0215976 |

(51) Int. Cl.
  *G01C 3/08* (2006.01)
  *G01S 7/481* (2006.01)
  *G01S 17/42* (2006.01)
  *G01S 17/89* (2020.01)

(52) U.S. Cl.
  CPC ............ *G01S 7/4815* (2013.01); *G01S 17/42* (2013.01); *G01S 17/89* (2013.01)

(58) Field of Classification Search
  CPC ...... G01S 17/10; G01S 7/481; H04N 13/0022
  USPC .......................................................... 356/5.01
  See application file for complete search history.

(56) References Cited

U.S. PATENT DOCUMENTS

| 4,329,876 A | 5/1982 | Chen et al. |
| 5,138,687 A | 8/1992 | Horie et al. |
| 5,511,142 A | 4/1996 | Horie et al. |
| 5,991,073 A | 11/1999 | Woodgate et al. |
| 8,042,949 B2 | 10/2011 | Taylor et al. |
| 8,272,743 B2 | 9/2012 | Taylor et al. |
| 8,300,304 B2 | 10/2012 | Gally et al. |

(Continued)

FOREIGN PATENT DOCUMENTS

WO 2016160048 A1 10/2016

OTHER PUBLICATIONS

Non-Final Office Action dated May 1, 2019, issued in U.S. Appl. No. 16/036,814 (10 pages).

(Continued)

*Primary Examiner* — Mark Hellner
(74) *Attorney, Agent, or Firm* — Sheppard Mullin Richter & Hampton LLP (57) ABSTRACT

Systems and methods for projecting and detecting light are disclosed. Systems and methods for determining surface depth information using Time-of-Flight ("ToF") detectors configured to measure time-of-flight in connection with flood light reflections, structured light reflections, and/or a fusion of both (e.g., in a selective, controlled, and/or patterned manner) are disclosed. Some portions of this disclosure also relate to embodiments of the technology configured for operation in connection with a switchable diffuser.

27 Claims, 6 Drawing Sheets

(56) References Cited

U.S. PATENT DOCUMENTS

| | | | |
|---|---|---|---|
| 8,384,997 | B2 | 2/2013 | Shpunt et al. |
| 8,408,775 | B1 | 4/2013 | Coleman |
| 8,477,819 | B2 | 7/2013 | Kitamura |
| 8,749,796 | B2 | 6/2014 | Pesach et al. |
| 8,872,085 | B2 | 10/2014 | Gruhlke et al. |
| 9,036,158 | B2 | 5/2015 | Pesach |
| 9,097,826 | B2 | 8/2015 | Vasylyev |
| 9,318,877 | B2 | 4/2016 | Herschbach et al. |
| 9,459,461 | B2 | 10/2016 | Santori et al. |
| 9,535,537 | B2 | 1/2017 | Large et al. |
| 9,575,352 | B2 | 2/2017 | Weber et al. |
| 10,254,542 | B2 | 4/2019 | Kollin et al. |
| 10,310,261 | B2 | 6/2019 | Christmas et al. |
| 10,345,506 | B1 | 7/2019 | Lyu |
| 2002/0028045 | A1 | 3/2002 | Yoshimura et al. |
| 2002/0097962 | A1 | 7/2002 | Yoshimura et al. |
| 2005/0201657 | A1 | 9/2005 | Tiefenthaler |
| 2006/0062509 | A1 | 3/2006 | Krol et al. |
| 2008/0297809 | A1 | 12/2008 | Holzapfel et al. |
| 2009/0201571 | A1 | 8/2009 | Gally et al. |
| 2009/0219253 | A1 | 9/2009 | Izadi et al. |
| 2009/0225244 | A1 | 9/2009 | Wang et al. |
| 2009/0276734 | A1 | 11/2009 | Taylor et al. |
| 2010/0284082 | A1 | 11/2010 | Shpunt et al. |
| 2011/0134955 | A1 | 6/2011 | Kitamura |
| 2011/0170108 | A1 | 7/2011 | Degertekin |
| 2012/0038891 | A1 | 2/2012 | Taylor et al. |
| 2012/0038986 | A1 | 2/2012 | Pesach |
| 2012/0127128 | A1 | 5/2012 | Large et al. |
| 2013/0038881 | A1 | 2/2013 | Pesach et al. |
| 2013/0082905 | A1 | 4/2013 | Ranieri et al. |
| 2014/0049983 | A1 | 2/2014 | Nichol et al. |
| 2014/0300960 | A1 | 10/2014 | Santori et al. |
| 2015/0029211 | A1 | 1/2015 | Weber et al. |
| 2015/0092258 | A1 | 4/2015 | Herschbach et al. |
| 2015/0271476 | A1* | 9/2015 | Wan .............. H04N 5/37452 348/46 |
| 2017/0082855 | A1 | 3/2017 | Christmas et al. |
| 2017/0329149 | A1 | 11/2017 | Fattal |
| 2018/0024289 | A1 | 1/2018 | Fattal |
| 2018/0067251 | A1 | 3/2018 | Baldwin et al. |
| 2018/0120563 | A1 | 5/2018 | Kollin et al. |
| 2018/0156963 | A1 | 6/2018 | Fattal |
| 2018/0172893 | A1 | 6/2018 | Fattal et al. |
| 2018/0196194 | A1 | 7/2018 | Fattal |
| 2019/0018137 | A1* | 1/2019 | Akkaya .............. G06T 7/521 |
| 2019/0137333 | A1 | 5/2019 | Lim et al. |

OTHER PUBLICATIONS

Non-Final Office Action dated May 8, 2019, issued in U.S. Appl. No. 16/259,812 (8 pages).
Non-Final Office Action dated May 8, 2019, issued in U.S. Appl. No. 16/268,493 (9 pages).
Non-Final Office Action dated May 22, 2019, issued in U.S. Appl. No. 16/036,776 (10 pages).
Non-Final Office Action dated Jul. 15, 2019, issued in U.S. Appl. No. 16/379,489 (13 pages).
Notice of Allowance dated Feb. 26, 2019, issued in U.S. Appl. No. 16/036,801 (8 pages).
U.S. Appl. No. 16/036,776, filed Jul. 16, 2018.
U.S. Appl. No. 16/036,814, filed Jul. 16, 2018.
BenQ Materials to Unveil the Innovative PNLC Film at SID 2018, May 20, 2018; retrieved on Apr. 29, 2019, at http://www.benqmaterials.com/en-ww/news/detail.php?SID=52 (1 page).
PDLC Film, An integral component of Switchable Privacy Glass, Polymer Dispersed Liquid Crystal (PDLC Film), 2019; retrieved Apr. 29, 2019, at https://www.switchglass.com/au/pdlc-film/ (3 pages).
Fanglu Lu et al., "Planar high-numerical-aperture low-loss focusing reflectors and lenses using subwavelength high contrast gratings", Optics Express, vol. 18, No. 12, Jun. 7, 2010, pp. 12606-12614.
Li Zhu et al., "Flexible photonic metastructures for tunable coloration", Optica, vol. 2, No. 3, Mar. 2015, pp. 255-258.
Final Office Action dated Sep. 27, 2019, issued in U.S. Appl. No. 16/036,814 (25 pages).
Notice of Allowance dated Sep. 27, 2019, issued in U.S. Appl. No. 16/259,812 (6 pages).
Notice of Allowance dated Oct. 30, 2019, issued in U.S. Appl. No. 16/379,489 (8 pages).
Non-Final Office Action dated Oct. 30, 2019, issued in U.S. Appl. No. 16/573,510 (9 pages).
Notice of Allowance dated Dec. 19, 2019, issued in U.S. Appl. No. 16/036,814 (15 pages).

* cited by examiner

SYSTEMS AND METHODS FOR ENHANCED TOF RESOLUTION

CROSS-REFERENCE TO RELATED APPLICATIONS

The present application is a continuation-in-part of U.S. patent application Ser. No. 16/268,493 filed on Feb. 5, 2019 (which is based upon and claims priority to Chinese Patent Application No. 201910073808.5, filed on Jan. 25, 2019), which is a continuation-in-part of U.S. patent application Ser. No. 16/259,812 filed on Jan. 28, 2019 (which is further based upon and claims priority to Chinese Patent Application No. 201910035662.5, filed on Jan. 15, 2019). The present application is also based upon and claims priority to Chinese Patent Application No. 201910215970.6, filed on Mar. 21, 2019, and Chinese Patent Application No. 201910215976.3, filed on Mar. 21, 2019. All of the above-referenced applications are incorporated herein by reference in their entirety.

TECHNICAL FIELD

This disclosure relates to systems and methods for projecting and detecting light, and advanced technologies for determining surface depth information using Time-of-Flight ("ToF") detectors configured to measure time-of-flight in connection with flood light reflections, structured light reflections, and/or a fusion of both (e.g., in a selective, controlled, and/or patterned manner). Some portions of this disclosure also relate to embodiments of the technology configured for operation in connection with a switchable diffuser.

BACKGROUND

Light projecting technologies are essential for enabling several important device functionalities. For example, structured light projection and detection components may be deployed in 3D camera modules of mobile phones for recognizing facial features (e.g., for authentication purposes, emoji generation, etc.). In such systems, projected light may reflect off the facial features of a user, and may be captured by a detector and analyzed by algorithms to "perceive" or "resolve" the topology of the user's face. Light projection technologies are also relevant to many other functions beyond facial recognition, of course, including for generating 3D point clouds for scene reconstruction (e.g., for use in modeling, virtualized environments, etc.), for computing depth or other dimensions of a real space (e.g., a mobile app used in construction or design that computes the dimensions of a room in a building), LiDAR applications, etc.

Current light projection technologies are disadvantaged, however, both for high cost, large size, low integration, and poor depth resolution of ToF based images. In particular, conventional ToF technologies rely on flood light illumination to resolve depth. That is, a flood light source is used to illuminate a target, then reflections of that flood light (off of a surface the flood light was projected onto) are captured by a ToF sensor to measure return time differences in the reflected light.

Unfortunately, the conventional use of flood light sources to illuminate a surface for ToF based measurements does not result in highly accurate depth resolution. Indeed, flood light detections are more heavily influenced by light emissions within the environment that did not originate from the projecting light source, and as a result the signal-to-noise ratio is low.

Furthermore, conventional light projection technologies do not fully utilize already available light sources to achieve the many imaging objectives that might be useful for the various functionalities noted above. Instead, conventional light systems utilize multiple projection sources to achieve their objectives. These inefficiencies impose bottlenecks for the advancement of device structure and function built on or around the light projection features. Therefore, improvements over the existing light projecting technologies are desirable for both the consumer market and the industry generally.

SUMMARY

Systems and methods for enhancing time-of-flight based depth determinations using projected patterns of structured light, alone or in combination with projected flood light.

In accordance with various embodiments, a system of the present disclosure may include a light projecting subsystem configured to project a pattern of structured light; a ToF sensor configured to detect reflections of the projected pattern of structured light off of a surface, and provide one or more indications of a time-of-flight associated with one or more portions of the pattern of structured light; and a processing engine (e.g., a controller) electrically coupled with a non-transitory computer readable medium having machine readable instructions stored thereon, which, when executed by the processing engine, cause the system to: determine one or more depth measures associated with one or more portions of the surface based on the one or more time-of-flight indications associated with the pattern of structured light. Collecting the depth measures associated with multiple portions of the surface may inform a 3D topology of said multiple portions of the surface. It will be understood that, for purposes of this disclosure, the term "computer readable medium" extends to any medium configured to store machine readable instructions that can be executed by a processing engine. For example, such mediums may be found in a microcontroller unit, as system on a chip, or in any combination of the foregoing.

In some embodiments, the light projecting subsystem may include a light source configured to project structured light. In further embodiments the light projecting subsystem includes a light source and a light projecting structure used in combination with the light source to project a pattern of structured light. In still further embodiments, the light projecting subsystem may further include a switchable diffuser configured to selectively diffuse incoming light based on the state of a control source coupled thereto (e.g., a voltage source being "on" or "off"). That is, when deployed with a switchable diffuser, the light projecting subsystem may be configured to project flood light when the switchable diffuser is in a first state, and project structured light when the switchable diffuser is in a second state. The control source may operate in accordance with instruction from a controller (or processing engine) that regulates the voltage delivered to the switchable diffuser therefrom. Such a controller may cause the control source to oscillate between a first condition and a second condition which causes the switchable diffuser to oscillate between the first state and the second state, thereby causing oscillating projections of flood light and structured light. Such a controller may cause the control source to oscillate between conditions at a predetermined rate (or otherwise with predetermined timing) to effectuate a desired timing, proportion, or multiplexing attribute of flood light and structured light (e.g., within a given image capture period).

In some embodiments incorporating a switchable diffuser, the ToF sensor may further be configured to detect reflections of projected flood light off of a surface, and to provide one or more indications of a time-of-flight associated with one or more portions the projected flood light. In such embodiments, the non-transitory computer readable medium may further include machine readable instructions which, when executed by the processing engine, cause the system to determine one or more depth measures associated with one or more portions of the surface based on the one or more time-of-flight indications associated the projected flood light (in addition to, as an alternative to, or in any desired combination/fusion with time-of-flight indications associated with the structured light).

In some instances, a depth measure associated with a portion of the surface may be based on a time-of-flight measure/indication in association with projected structured light only.

In some instances, a controller configured to effectuate and regulate operations of the system may cause, based on the application being used or an estimated distance to an object being imaged (or based on any other criteria), the system to generate structured light only, flood light only, or a combination of structured light and flood light. Similarly, in some instances a controller configured to effectuate and regulate operations of the system may cause, based on the application being used or an estimated distance to an object being imaged (or based on any other criteria), the system to determine a depth measure based on time-of-flight measures/indications in connection with structured light only, flood light only, or a combination of structured light and flood light.

In some embodiments, a time-of-flight measure is based on both a structured light reflection and a flood light reflection. In some embodiments, a fused time-of-flight measure associated with a particular portion of the surface may be generated based on combination of a structured light time-of-flight measure and a flood light based time-of-flight measure. In some embodiments, a controller configured to effectuate and regulate operations of the system may cause, based on the application being used or an estimated distance to an object being imaged (or based on any other criteria), the system to determine depth measures for some portions of a surface being imaged based on flood light time-of-flight measures/indications, and to determine depth measures for other portions of a surface being imaged based on structured light time-of-flight measures/indications.

In some embodiments, a controller configured to effectuate and regulate operations of the system may cause, based on the application being used or an estimated distance to an object being imaged (or based on any other criteria), the system to determine depth measures for some portions using a first selection of either flood light only, structured light only, or a combination of flood light and structured light; and to determine depth measures for some other portions using a second selection of either flood light only, structured light only, or a combination of flood light and structured light. In some embodiments, the first selection and the second selection are different.

In some embodiments, the non-transitory computer readable medium may further comprise machine readable instructions stored thereon which, when executed by a processing engine, cause the system to select, among a plurality of optional patterns of structured light, a pattern of structured light for projection. The pattern may be any pattern, including but not limited to a uniform dot array pattern, a non-uniform dot array pattern, a uniform stripe pattern, a non-uniform stripe pattern, a uniform checkered pattern, a non-uniform checkered pattern, a random pattern of any one or more of the foregoing, etc. The selection may be based on an application being used, an estimated distance between the light projecting subsystem and the surface, or any other criteria specified for a given implementation.

In some embodiments, the system may further include machine readable instructions stored on the non-transitory computer readable medium (e.g., in a memory of a controller), which, when executed by the processing engine (e.g., by a processor of a controller), cause the system to modulate the projected light in accordance with one or more of an amplitude modulation, frequency modulation, phase modulation, and pulse modulation. In some embodiments the instructions, when executed, may cause the system to modulate the structured light in accordance with one or more of an amplitude modulation, frequency modulation, phase modulation, and pulse modulation scheme. In some embodiments the instructions, when executed, may cause the system to select, among a plurality of optional modulation schemes, a modulation scheme for modulating the structured light, the selection based on (i) an application being used by a device within which the ToF module is integrated, (ii) an estimated distance the surface is from the light projecting system, and/or (iii) any other criteria desired for a particular implementation.

In accordance with various embodiments, methods for enhancing time-of-flight based depth determinations using projected patterns of structured light, alone or in combination with projected flood light, include steps for accomplishing any of the functionality described herein, including any functionality described in the context of a system, subsystem, device, or other element of the foregoing.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

The disclosure and figures of each of U.S. application Ser. Nos. 16/036,776, 16/036,801, and 16/036,814 are hereby incorporated by reference into the instant disclosure in their entirety. Similar features and elements within each specification may be substituted or reapplied for one or more elements discussed below, as will be readily apparent to a person of ordinary skill in the art.

Figure 1:
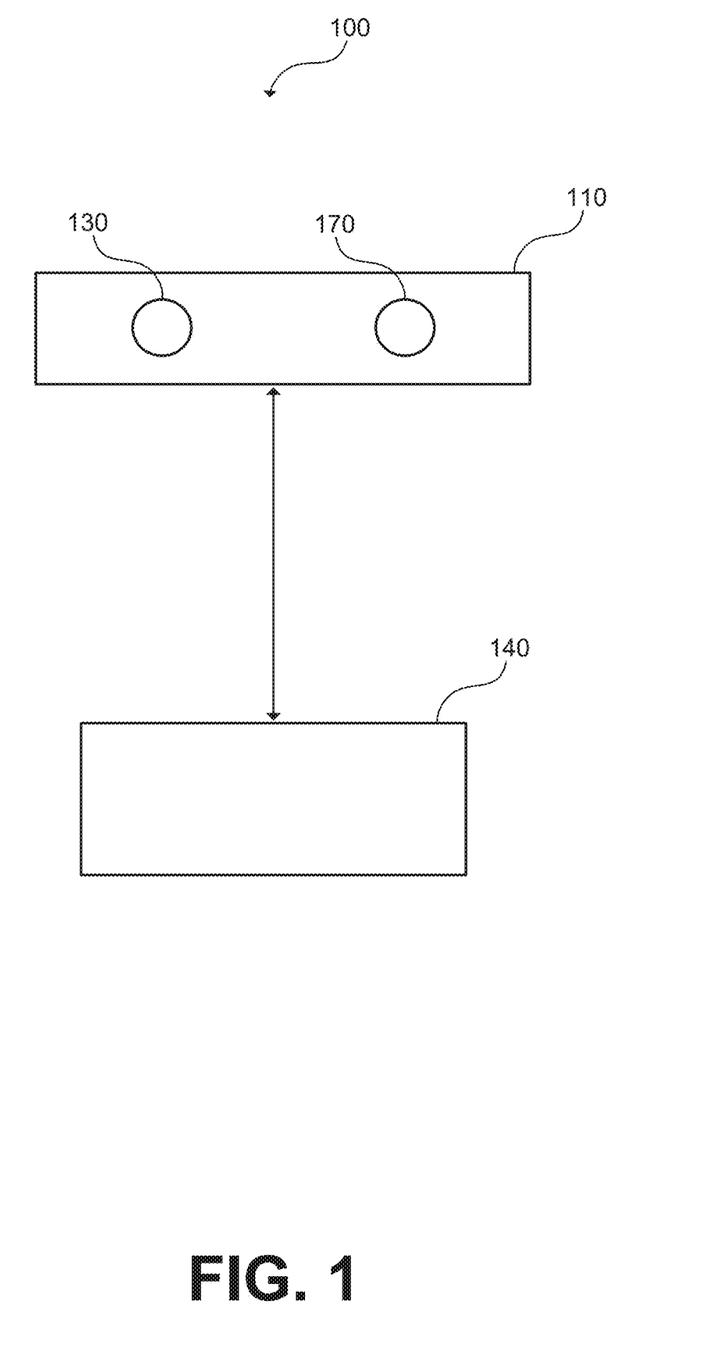
FIG. 1 is a graphical illustration of an example system for enhanced resolution ToF based depth detection in accordance with various embodiments of the present disclosure.

FIG. 1 is a graphical illustration of an example system 100 for enhanced resolution ToF based depth detection in accordance with various embodiments of the present disclosure. System 100 may include a light projecting subsystem 130 and a ToF detector 170 mounted to or otherwise held by a module 110 (the module providing structural, optical, and/or electrical support), and a controller 140 in operative communication with module 110 (or one or more elements of module 110). Light projecting subsystem 130 may be configured to produce structured light projections during image capture, and ToF detector 170 may be configured to capture reflections of the structured light projections off of a surface, and determine one or more of a time difference, phase shift, or frequency shift of the light reflections and generate an indication of the same. That is, system 100 is configured to use reflections from the structured light (e.g., a dot array) projected onto a surface (instead of reflections of flood light off of the surface) to determine the depth and/or topology of a surface based on time-of-flight detections.

Light projecting subsystem 130 may be configured to project structured light in a particular pattern. For purposes of this disclosure, "pattern" may refer, individually or collectively, to: the form, design, or articulation of the structured light projection, the boundary, area, space, or zone within which the structured light is projected, and/or the angle at which one or more portions of the structured light is projected. For instance, light projecting subsystem 130 may be configured to generate, guide, or concentrate light from a light source such that it is projected in a specified or random form in a localized or full-field area. For example, light projecting subsystem 130 may be configured to generate structured light in the form of a dot array where the dot beams are projected in a specified arrangement (e.g., uniform) or random arrangement. In another example, the light projecting subsystem 130 may be configured to generate structured light in the form of a stripe array where stripes of collimated light are projected in a specified arrangement (e.g., uniform spacing and dimension) or random arrangement (e.g., non-uniformly stacked, crisscrossed, crosshatched, etc.). The examples herein are not intended to be limiting in any way, and it should be appreciated that any other pattern of structured light may be projected in implementations of the technology disclosed herein.

In some embodiments, the light projecting subsystem 130 may be configured to project light spanning the full-field projection space within which the light projecting subsystem 130 is capable of projecting. For instance, for a given application it may be desirable to generate a pattern of structured light resembling a checkerboard pattern across the full range of space within which the light projecting subsystem 130 is capable of projecting (i.e. the full-field projection space). In another application, it may be desirable to generate a pattern resembling a grid of uniformly spaced dots within the full-field. In some embodiments, the light projecting subsystem 130 may further be configured to project light at within a localized boundary that is, in some embodiments, less than the full-field projection space within which the light projecting subsystem 130 is capable of projecting. In some particular embodiments it may be desirable to generate a pattern resembling a grid of uniformly spaced dots that do not get projected throughout the full-field, but which instead are concentrated into a region defined by a localized boundary that takes on the shape an oval (e.g., for facial recognition) confined by a boundary that is smaller than the full-field light projection limit of the light projecting subsystem 130. In facial recognition implementations, for example, light projecting subsystem 130 may project a grid pattern of uniformly spaced dots within in an oval shaped boundary which, at a projection distance of about between 1.5-2.5 feet from the module 110 (or other estimated distance from the user's face), may span a dimension estimated to capture substantially all of an average user's face for facial recognition purposes. In some embodiments, system 100 may be configured to perform feature detection within the full-field, then based on the detected dimensions and/or position of a surface of interest, adjust the projection boundary to capture the surface of interest. In some such embodiments, the adjustment may define a projection boundary with a buffer zone to account for movement of the surface and the full projection field relative to one another.

By projecting patterns of structured light via light projecting subsystem 130, and configuring ToF detector 170 to resolve these structured light reflections (instead of, or in addition to, flood light reflections), the signal-to-noise ratio ("SNR") may be substantially increased relative to the SNR achieved using just flood light based illuminations from the same or similar light source. That is, in accordance with some embodiments, the SNR achieved (for ToF detection purposes) by one or more of the structured light projections (e.g., dot projections in a dot array) produced by light projection subsystem 130 may be substantially higher than the SNR achieved by flood light projections produced by the same or similar source. This is due, in part, to the higher power density provided by the structured light projections produced by light projection subsystem 130, relative to the density of a simple flood light illumination produced by the same or similar light source (e.g., the same or similar laser or diode). Consequently, the resolution of ToF based depth measurements obtained by implementing embodiments of the patterned ToF systems of the present disclosure (instead of the mere flood illumination systems used conventionally) is substantially enhanced over prior art systems.

By projecting structured light within a localized space comprising less than the full-field boundary, power density may be enhanced within the structured beams projected, and additionally the amount of noise the light projecting system 130 causes with respect to other nearby devices may be reduced.

As shown in FIG. 1, system 100 may include a controller 140 that is operatively coupled with one or more of the light projecting system 130 and the ToF detector 170, among other components and subsystems of module 110 (some of which are shown in FIGS. 2-5, and 7. Although controller 140 is not illustrated as being an integrated element of module 110, in some embodiments it may be integrated. In some embodiments, processing operations may be performed by an off-board processing engine (e.g., controller 140 as shown), or an on-board processing engine (e.g., a controller integrated within module 110), or may be distributed between a combination of both.

Controller 140 may be configured to actuate a light source to cause the light source to generate light emissions. Controller 140 may further be configured actuate and/or process light information received by ToF detector 170 during or after a time in which controller 140 has actuated the light source. In some embodiments, controller 140 is configured to modulate the light projected via light projecting system 130 to produce modulated light signals. For example, controller 140 may be configured to operate together with one or more elements of light projecting subsystem 130 to provide pulse modulation, amplitude modulation, frequency modulation, or any other type of modulation desired for the particular deployment. That is, the controller 140 may be configured to operate together with one or more elements of system 100 (e.g., ToF detector 170) to resolve light reflections in accordance with the modulation scheme effectuated. Said differently, the controller 140 may be configured to operate together with one or more elements of system 100 (e.g., ToF detector 170) to demodulate the light reflections received at the ToF detector 170.

In some embodiments, controller 140 is configured to modify the modulation scheme that is effectuated based on (i) an application being used by a device within which the ToF module is integrated, (ii) an estimated distance the to-be-imaged surface is from the light projecting system, and/or (iii) any other criteria desired for a particular implementation. For instance, controller 140 may operate in concert with light projection system 130 to generate amplitude modulated light emissions for short distance based applications (e.g., where the object imaged is expected within 10 meters of the module 110). Controller 140 may also operate in concert with light projection system 130 to generate pulse, phase, or frequency modulated light emissions for longer distance based applications (e.g., where the object imaged is expected more than 10 meters or 20 meters, for example).

Referring still to FIG. 1, light projecting subsystem 130 may in some embodiments include the light source itself, as well as other elements or components that can guide and/or project the light in a particular manner, as desired. In other embodiments, the light source may be considered as a component that is distinct from the light projecting subsystem 130, and generates light that is at some stage in-coupled into light projecting subsystem 130 (which may include other optical elements—e.g., waveguides, grating structures, etc.—to achieve the desired patterns).

Figure 2:
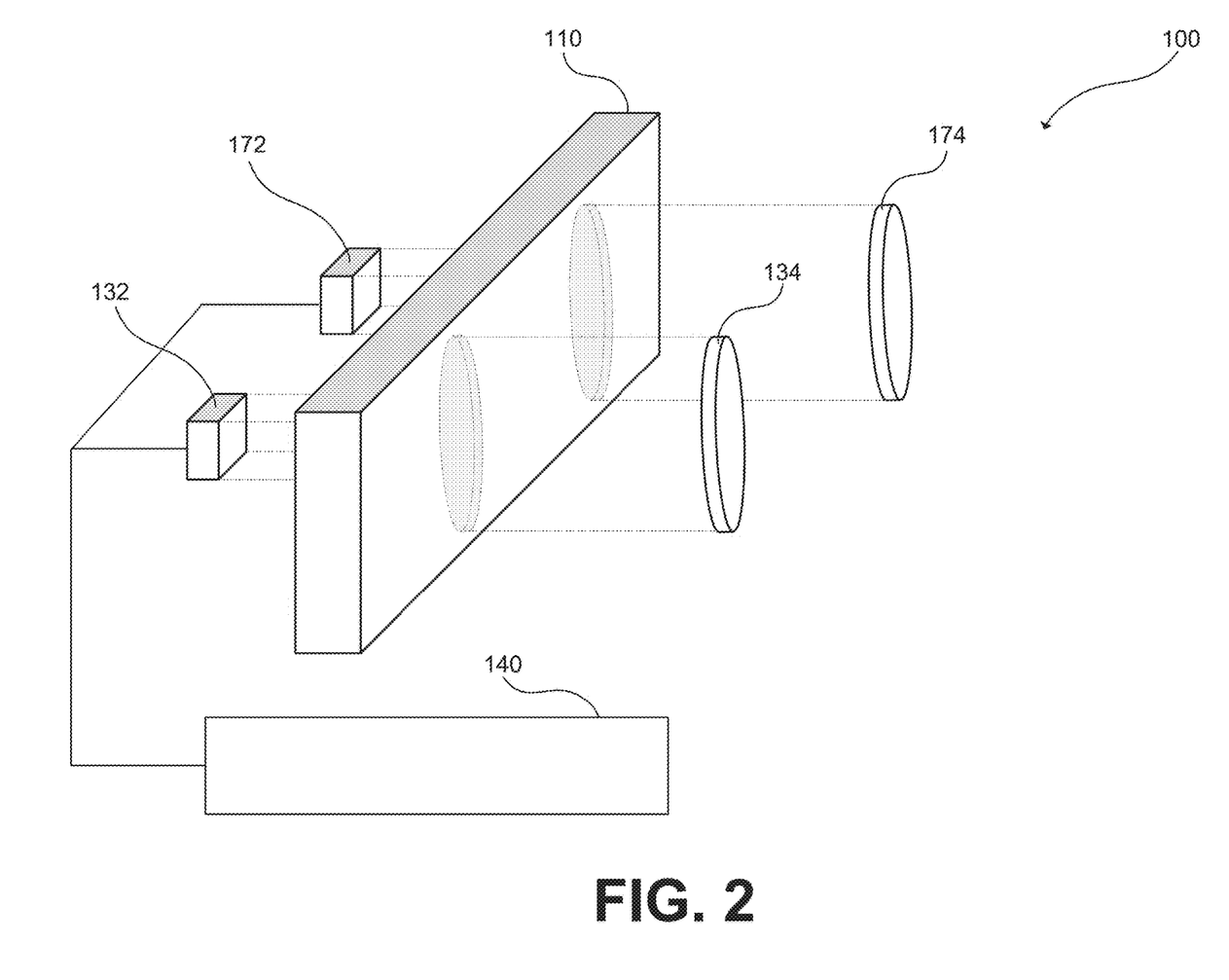
FIG. 2 is a side-view graphical illustration of an example system for projecting a pattern of structured light for enhanced resolution ToF based depth detection in accordance with various embodiments of the present disclosure.

FIG. 2 illustrates a side-view graphical assembly illustration of an example system 100 for projecting structured light projections from a light projection subsystem to achieve enhanced resolution ToF based depth detection in accordance with one or more embodiments of the present disclosure. Referring to FIG. 2, an example light projecting subsystem 130 of an example system 100 (introduced in FIG. 1) may include a light source 132 and a light projecting structure 134. An example light projecting structure 134 may be a beam array projecting structure, such that the projected beam array forms an array (e.g. a dot array) on a surface (e.g., a 2D surface, a 3D surface, etc.). In operation, the light from the light source 132 passes into and out of the light projecting structure 134 to reach the object (not shown) of interest for imaging. ToF detector 170 (introduced in FIG. 1) may include a light sensor 172 configured to receive and process the light reflected off of the object being imaged. ToF detector may be any sensor or camera module configured to measure time, phase, or frequency differences in reflections of light generated by light projecting subsystem 130. For example, a ToF detector may include a CMOS array, SPAD detector, or any other sensor configured to detect structured light reflections off of a target surface. ToF detector 170 may in some instances include one or more other optical or optoelectronic elements to filter, channel or otherwise guide desired light reflections to light sensor 172. Filter 174 is shown in FIG. 2 is an example of an optical element that may, but need not, be used in connection with light sensor 172.

Light source 132 may comprise any form of light source that produces structured light, or that produces light in a form that can be transformed into structured light. For example, light source 132 may emit infrared (IR) light, or any other visible or nonvisible light within any range of the electromagnetic spectrum which, alone or together with transformations caused by a light projecting structure 134 may project structured light toward a target surface, including structured light in a particular pattern as desired for a given use case.

Light source 132 may include a single laser (e.g., an edge-emitting laser, a vertical-cavity surface-emitting laser (VCSEL)), a light-emitting diode (LED) with light collimation, or the like. Alternatively, the light source 132 may comprise multiple lasers or diodes (e.g., an edge-emitting laser array, a VCSEL array, a LED array). The light source 132 may include one or more of the light sources disclosed in U.S. application Ser. Nos. 16/036,776, 16/036,801, and 16/036,814, each of which is incorporated herein by reference in its entirety.

Light projecting structure 134 may comprise a waveguide configured to receive light emitted from light source 132, and project structured light (e.g., a plurality of dot beams, a plurality of stripe structured light, or any other pattern of structured light). In such embodiments, light emissions from light source 132 may be coupled into light projecting structure 134 from any surface or portion of a surface of the light projecting structure 134, and/or couple out of the light projecting structure 134 from any surface or portion of a surface of the light projecting structure 134.

Light projecting subsystem 130 may comprise any one or more of the light projecting devices and light projecting structures disclosed in U.S. application Ser. Nos. 16/036,776, 16/036,801, and 16/036,814, each of which is which is incorporated herein by reference in its entirety. In one nonlimiting example, in some embodiments, the light projecting system 130 may comprise a projection lens structure such as projection lens structure 231 of U.S. application Ser.

No. 16/036,801, which may be configured to collimate the light from the light source, and/or to project a random or patterned dot array. For example, per working distance requirement of different applications, the laser waist of the projected beam array as collimated by the projection lens structure 231 can vary from 10 mm to 1 meter. Thus, the projection lens structure 231 may collimate the output light to form clear pattern (e.g., a dot array pattern, stripe stack pattern, checkered pattern) for projection at a distance of interest (e.g., in the range of 10 cm to 10 m depending, for instance, on the application being used). In another nonlimiting example, any of the grating structures disclosed in U.S. application Ser. No. 16/036,801 may be utilized as, with, or in connection with one or more of the light sources 132, projection lenses, and/or light projecting structures/waveguides 134 of the present disclosure. In another nonlimiting example, light projecting subsystem 130 may comprise the system 102 of U.S. application Ser. No. 16/036,801.

In some alternative embodiments, light projecting subsystem 130 may comprise multiple diodes (e.g., lasers such as an edge-emitting laser array or a VCSEL array, diodes such as a LED array), or any other structure that produces a beam array arranged to impinge on a target surface (or onto another optical element through which the light may pass on the way to the target surface (e.g., a switchable diffuser, discussed with reference to FIG. 3)). Light projecting subsystem 130 may include one or more of the structures or systems disclosed in U.S. application Ser. Nos. 16/036,776, 16/036,801, and 16/036,814, each of which is incorporated herein by reference in its entirety.

In some alternative embodiments, light projecting subsystem 130 may comprise a diffraction optical element ("DOE") to generate multiple dots in combination with a VCSEL array. For example, if the VCSEL array comprises 250 dots (e.g., beams of collimated light), the DOE in combination therewith may effectively provide a 10× multiplier to generate 2500 dots at the output plane. In another example, if the VCSEL array comprises 300 dots (e.g., beams of collimated light), the DOE in combination therewith may effectively provide a 100× multiplier to generate 30,000 dots at the output plane. Any type of DOE may be employed, including DOEs that generate/create any desired pattern of structured light from incoming light, including by way of example only, generating/creating multiples of incoming dot beams produced by an underlying VCSEL array (e.g., 10×-100×, or greater or less).

In some embodiments, light beams emerging from the light projecting structure 134 may couple out from a surface of the light projecting structure 134 for projection onto a target surface of an object (e.g., a face). Reflections therefrom may be detected and transduced by light sensor 172 of ToF detector 170, under the control of controller 140 (or other processing engine).

In some embodiments, a switchable diffuser may be incorporated in systems of the present disclosure to enable controlled projections of both flood light and structured light from a single light source. Switchable diffusers may be configured, under the control of a controller 140, for example, to selectively generate/project both flood illumination and structured light projections for detection by the ToF detector 170 and/or any other light sensory components that may be provided within or near module 110 (e.g., an IR camera used for a different purpose than ToF light sensor 172).

For example, under control of controller 140, switchable diffuser may be configured to switch between one or more states (e.g., an "on" state or an "off" state) whereby it may selectively diffuse structured light or allow structured light to pass through. Use of a switchable diffuser in accordance with the present disclosure enables ToF measurements to be based on a combination or fusion of flood illuminations and structured light projections. Switchable diffusers that may be incorporated in connection with embodiments of the present disclosure include at least those described in U.S. application Ser. Nos. 16/259,812, and 16/268,493, as well as Chinese Application Nos. 201910035662.5 and 201910073808.5, which are incorporated herein by reference in their entirety.

Figure 3:
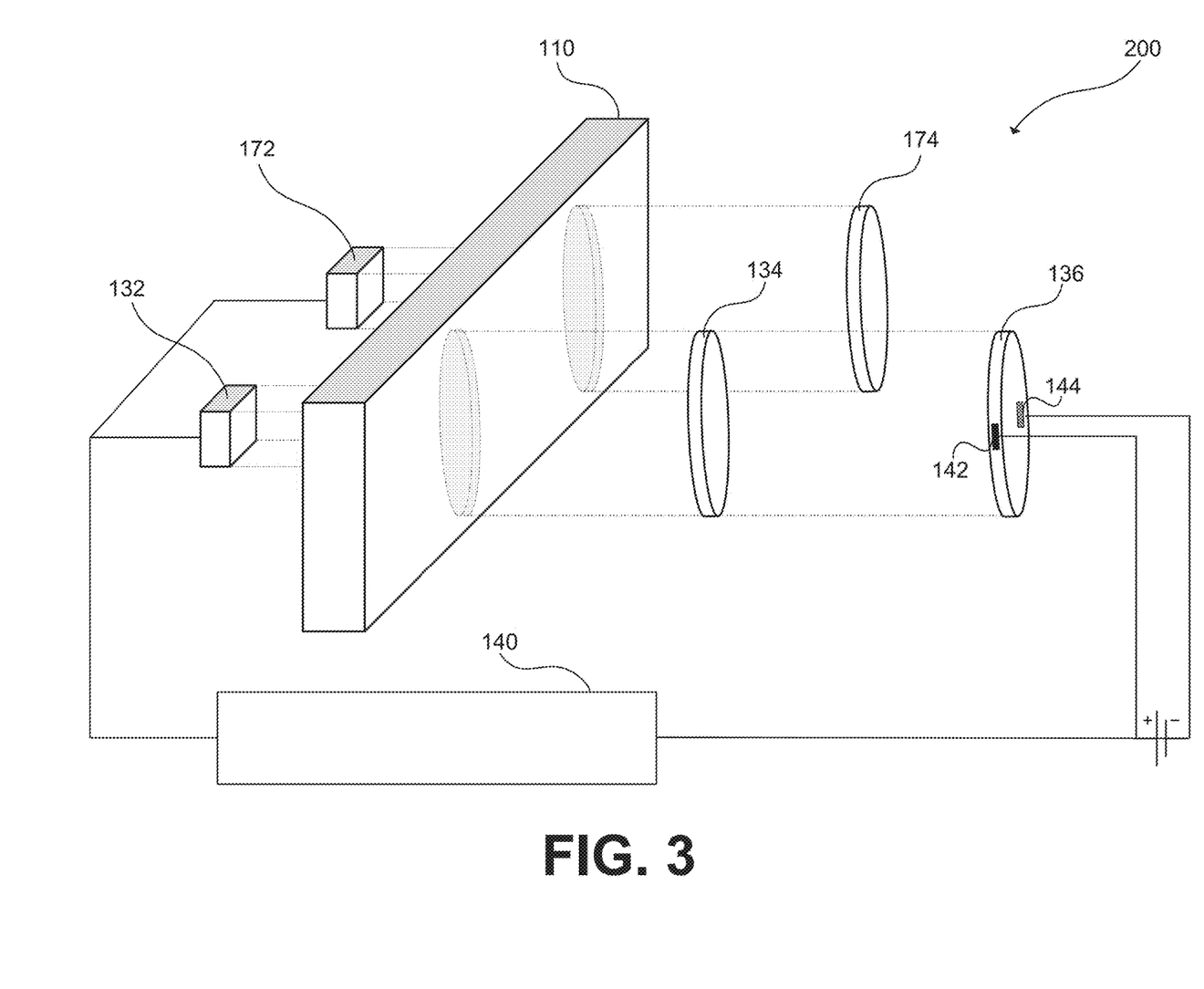
FIG. 3 is a graphical illustration of an example system for generating a multiplexed projection of structured light and flood light for enhanced resolution ToF based depth detection in accordance with various embodiments of the present disclosure.

FIG. 3 illustrates a diagram depicting an example enhanced resolution ToF based imaging system 200 of the present disclosure, here incorporating a switchable diffuser. Common elements as between system 100 of FIGS. 1-2 and system 200 of FIGS. 3-4 retain common numbering for ease of reference. As may be observed, as between FIG. 2 and FIG. 3, the primary illustrated difference includes that in FIG. 3 the light projection system 130 includes a switchable diffuser 136 coupled (via contact pads 144 and 142) to controller 140, where FIG. 2 does not include such illustration.

Such an example system 200 may achieve high resolution ToF based depth measurements and 3D imaging based on structured light projections from light projection subsystem 130 and/or based on a fusion of flood light and patterned structured light projections from light projection subsystem 130. Such a system 200 for achieving patterned and/or fused ToF detection may include a light projecting subsystem 130 and a ToF detector 170 mounted to a module 110 (the module providing structural, optical, and/or electrical support), and a controller 140 in operative communication with module 110 (or one or more elements of module 110). As discussed in more detail herein, light projecting subsystem 130 may be configured to selectively produce both flood light and dot light projections during image capture, avoiding the need to mount and use multiple distinct light projection systems within a given module for installations where either or both flood light illumination and structured light illuminations may be desired, depending on the application being used. System 200 may be installed or otherwise implemented in connection with various systems or devices, such as mobile phones, computers, pads, wearable devices, vehicles, etc.

A light source of such a light projecting subsystem 130 may project structured or columnated light beams of a predetermined or random pattern onto a surface. The structured or columnated light may be coupled into and through one or more other optical and optoelectronic elements of the light projecting subsystem 130, such as a light projecting structure (e.g., a lens) and/or switchable diffuser element, as noted. In operation, light emitted out of a switchable diffuser element may be directed toward surface(s) of an object of interest (e.g., such as a face). Reflections of light off of the surface an object may be captured by one or more detectors (e.g., camera sensors), including but not limited to light sensor 172 of ToF detector 170.

Light information captured by ToF detector 170 may be used to determine depth information associated with different portions of such surface(s) based on particle time-of-flight measurements. In some embodiments, ToF based depth measurements are based on return time differences (or propagation and return time differences) between different portions of returning light reflections. Such measurements may be based on a measure of absolute or relative time differences between the returning light reflections off of a surface of the object (or off of multiple surfaces of different objects). Various other optically derived parameters may be determined based on the reflected light as captured by the sensor 172 of ToF director 172. In some embodiments, the detector is configured to receive reflections of out-coupled beams off multiple locations on a distant object to determine distances of the multiple locations relative to the system, or a designated element of the system, or a designated reference point in relation to the system.

As shown, the light projecting subsystem 130 and ToF detector 170 may be mounted to or otherwise coupled with the same modular structure (e.g., module 110). In some embodiments, the light projecting subsystem 130 and ToF detector 170 are mounted to or otherwise coupled with different modules. In each case, however, ToF detector 170 may be positioned to assume an orientation relative to the light projecting subsystem 130 such that reflections of the projecting subsystem's light off of multiple locations on a distant object may be received by the light sensor 172 of the ToF detector 170. The received reflections may be used to determine distances of the multiple locations relative to other reflections, relative to a template, relative to an absolute time-to-distance conversion formula or conversion factor, or relative to a predetermined reference point (e.g., the position of the light projecting subsystem 130). In some embodiments, a virtual flat reflective plane at a single position on the surface of the object may be used as a reference, and reflections of the projected light off the reference can be predetermined as reference reflection beams that can be used to compute relative differences of other captured reflections. For example, a surface topology (e.g., facial features in the case of a facial surface) can be determined based on time-of-flight differences between the detected reflection beams and the reference reflection beams.

Referring still to FIG. 3, switchable diffuser 136 may comprise any liquid crystal or polymer based mixture having an adjustable molecular orientation responsive to an applied voltage, including, for example, any prior art mixtures. For example, switchable diffuser 136 may include any polymer-liquid crystal mixture, or any other liquid crystal mixture. In some embodiments, the switchable diffuser 136 may comprise an immiscible mixture of liquid crystal and polymer such as a polymer dispersed liquid crystal (PDLC), or a polymer network liquid crystal (PNLC), or DLP material. Such mixtures combine the electro-optical properties of liquid crystals with structural properties provided by polymers. In other examples, switchable diffuser 136 may comprise a meta-stable liquid crystal (MSLC).

In some embodiments, the switchable diffuser 136 may display optical scattering properties when it is not subjected to a substantial electric field. PDLC type switchable diffusers 136, for instance, may provide such optically scattering properties. In some embodiments of a PDLC type switchable diffuser 136, the concentration of polymer within the liquid crystal may be about between 20% to 60% to achieve scattering. In some embodiments of a PDLC type switchable diffuser 136, the concentration of polymer within the liquid crystal may be about between 60% to 80%. The polymer is cured within the liquid/polymer emulsion such that droplets of liquid crystal separate out within the polymer structure. Liquid crystal molecules within each droplet have localized order, but each droplet may be randomly aligned relative to other droplets in the mixture. In some embodiments of switchable diffuser 136, the combination of small droplet size and isotropic orientation of droplets in the PDLC mixture leads to a highly optically scattering structure in the absence of a substantial electric field.

When a substantial electric field is applied across a PDLC type switchable diffuser 136, however, the orientation of the liquid crystal droplets in the mixture changes, reduces the degree of optical scattering that will occur when light is coupled into the structure and passes out the other side. If a sufficient electrical field is applied across a PDLC type switchable diffuser 136, in accordance with one or more embodiments of the present disclosure, the switchable diffuser 136 structure will achieve a substantially transparent state such that in-coupled light will pass through with little to no scattering.

Similarly, a PNLC type switchable diffuser 136, for example, may also provide optically scattering/diffusion properties. A PNLC type switchable diffuser 136 comprises a network of polymer chains throughout the structure, where concentration of polymer within the within the liquid crystal may be about between 1% to 15%. Like PDLCs, PNLCs may switch between a substantially scattering state and a substantially transparent state under application of appropriate electric fields.

In still further embodiments, an MSLC type switchable diffuser 136 may provide optically scattering/diffusion properties in response to certain conditions, and optically transparent properties in response to other conditions. An MSLC is a type of liquid crystal that may switch between a substantially scattering state and a substantially transparent states upon application of an appropriate electric field. But unlike most PNLCs and PDLCs, MSLCs do not require that the applied electric field be maintained in order to maintain a given state (e.g., a scattering state or a transparent state). Instead, MSLCs may be configured to switch between these two states based on temporary/momentary application of an electric field. For example, a driver may only need to send one AC signal with a duration long enough to make the transition from a substantially scattering state and a substantially transparent state, and vice versa. For instance, some embodiments of the present disclosure may include an MSLC type switchable diffuser 136 configured to switch from the substantially diffuse/scattering state to the substantially transparent state upon application of an AC voltage signal (e.g., of 60V with 1 kHz, 50% duty cycle) that lasts at least long enough to make the transition (i.e., switch) between states. Similarly, to switch from the substantially transparent state to the substantially diffuse/scattering state, another AC voltage signal (e.g., of 80V with 50 kHz, 50% duty cycle) may be applied for a period that is at least long enough to make the transition back. However, once the transition has taken place, no further application of an electric field is needed to maintain either the substantially transparent or substantially diffuse/scattering state. That is, in such embodiments, the voltage signal can be discontinued once the switch between states has occurred; and no additional voltage signal is needed until it is desired to affect a switch back to the other state.

Switchable diffuser 136 may further comprise additional layers in combination with the scattering elements. Such additional layers may provide polarization stability, structural support, and electric conductivity in connection with the PDLC, PNLC, and/or MSLC materials.

Accordingly, switchable diffuser 136 can be controlled to assume one of at least two different states—a diffuser/scattering state and a transparent state—depending on the electric field applied to it. For purposes of the present disclosure, the diffuser/scattering state may also be referred to herein as a "first state" or an "off state," and the transparent state may also be referred to herein as a "second state" or an "on state."

With reference still to FIG. 3, system 100 may include a controller 140 that is operatively coupled with one or more of light sensor 172 of ToF detector 170, and light source 132 and switchable diffuser 136 of light projection subsystem 130. Controller 140 may be configured to actuate light source 132, causing light source 132 to project light. Controller 140 may further be configured to process ToF indications or other information captured/generated via ToF detector 170 (via light sensor 172) during or after a time in which controller 140 has actuated light source 132. Controller 140 may further be configured to selectively apply an electric field (e.g., a voltage) to the switchable diffuser 136 to achieve switching between an off state (diffusion/scattering state) and an on state (transparent state). Controller 140 may be configured to effectuate synchronized operation of light sensor 172, light source 132, and switchable diffuser 136 to achieve a multiplexed (e.g., time division multiplexed) propagation of flood light projections and patterned structured light projections (e.g., uniform dot array pattern projections).

In particular, controller 140 may be configured to selectively oscillate (or otherwise change) the application of an electric field across switchable diffuser 136 while light from light source 132 (which optionally will have passed through light projecting structure 134) is being in coupled at a first surface of the switchable diffuser 136 and out coupled through a second surface of switchable diffuser 136. Such selective oscillations (or other selective changes) cause switchable diffuser 136 to switch between and off state and an on state such that during a first period of time the light emitted out of the second surface of switchable diffuser 136 comprises a flood light projection, and that during a second or subsequent period of time the light emitted out of the second surface of switchable diffuser 136 comprises a dot light projection.

Figure 4:
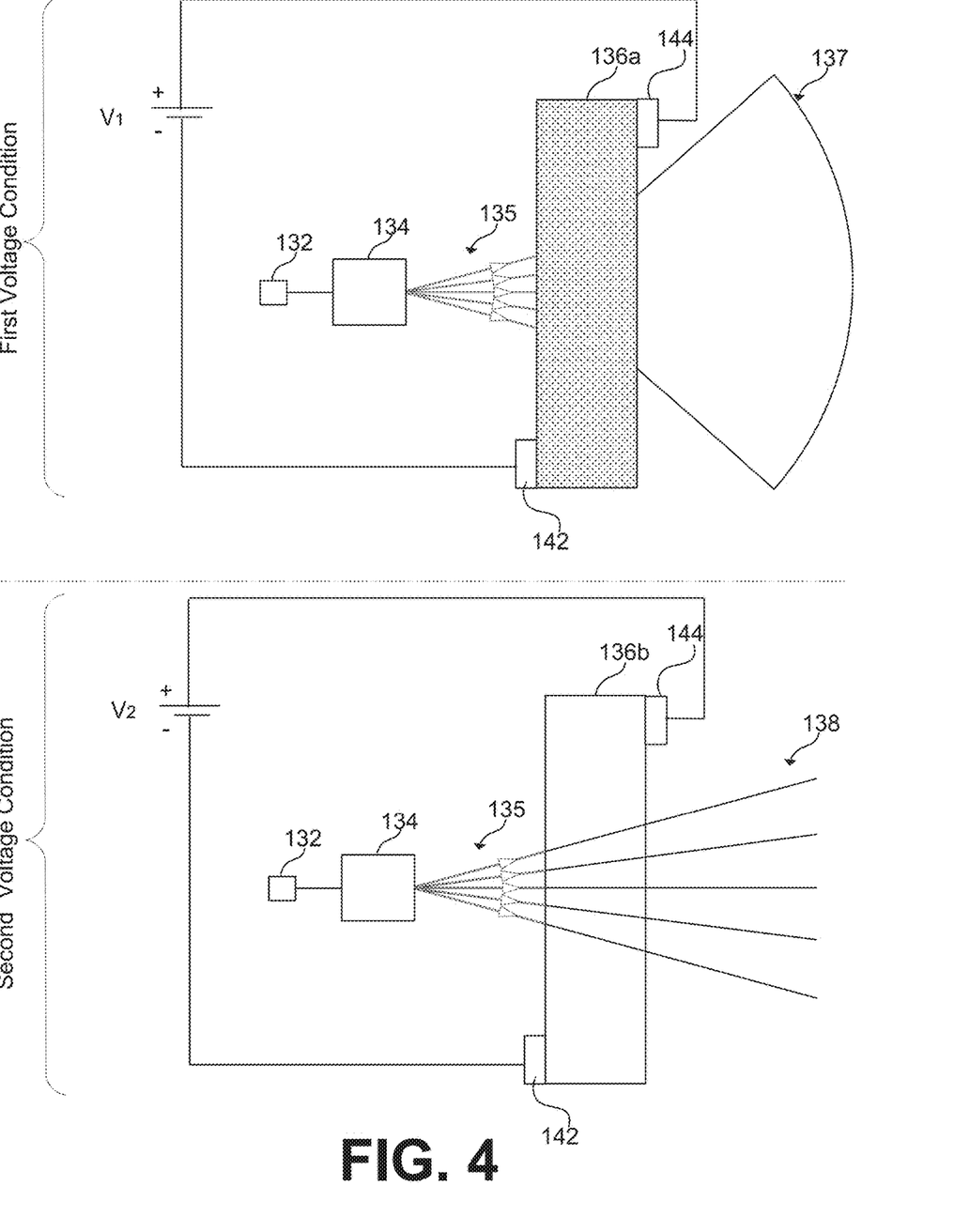
FIG. 4 illustrates a change in an example switchable diffuser incorporated into a patterned ToF module in accordance with various embodiments of the present disclosure, the illustrated change in such switchable diffuser occurring upon a change in an applied electric field across the switchable diffuser.

The switchable diffuser 136 may be actuated in any manner and by any combination of elements configured to control the application of an appropriate electric field, in order to effectuate a change in operation effecting the balance of light projections being emitted from light projection subsystem 130. FIG. 4 illustrates an example change in the operation of an example switchable diffuser 136 upon a change in an applied electric field across the switchable diffuser caused by a switch from a first voltage condition to a second voltage condition, where the change between the first voltage condition and second voltage condition (and consequently the "off" state and the "on" state of the switchable diffuser 136) are controlled by controller 140 (not shown).

Controller 140 may be coupled with a circuit including a voltage source that may apply a voltage to switchable diffuser 136. Conductive elements 142 and/or 144 may be integrated with or otherwise coupled to switchable diffuser 136 to enable an electric field to be applied across switchable diffuser 136. Controller 140 may selectively regulate the application of voltage from a voltage source to switchable diffuser 136 through the circuitry connected thereto. In some embodiments, controller 140 may actuate a switch that connects and/or disconnects a voltage source with one or more of conductive elements 142 and/or 144.

As shown, when a voltage source is controlled to deliver a first voltage (denoted by variable $V_1$ in the upper image of FIG. 4) to a switchable diffuser 136 (identified as 136a in the upper image), the switchable diffuser may remain in its natural condition and act as a diffuser/scatterer of incoming light. This may be referred to as the "off" state. In some embodiments, the first voltage, $V_1$, may be 0 V, wherein the "off" state actually corresponds to the voltage being turned "off" from the perspective of the switchable diffuser 136. It should be appreciated however, that the "off" state does not necessarily have to correspond to the voltage of a voltage source being turned off.

In some embodiments the "off" state of the switchable diffuser 136 may be achieved where the first voltage is about between 0 V and 1 V. In other embodiments, the "off" state of the switchable diffuser 136 may be achieved where the first voltage is any voltage that allows or causes the liquid crystals within the polymeric structure of switchable diffuser to maintain or achieve a molecular arrangement or orientation that causes in-coupled light to become substantially scattered as it passes therethrough—thereby providing a flood light projection.

As shown, under the first voltage condition, light source 132 may provide light that is in-coupled to light projecting structure 134. The light projected from light projecting structure 134 may comprise structured light in a particular pattern (e.g., a plurality of dot projections forming a uniform dot array (i.e., a plurality of narrow beams of light projected with substantially uniform distribution in at least one plane). Example dot projections are generally identified by numeral 135 in FIG. 3. The dot projections 135 may be incident upon a first surface of switchable diffuser 136, or otherwise coupled into switchable diffuser 136. Under the first voltage condition, the dot projections 135 that are in coupled to switchable diffuser 136 are scattered by the molecular structure of the switchable diffuser (e.g., this condition of switchable diffuser 136 being designated by numeral 136a). Consequently, switchable diffuser 136 transforms the incoming structured light 135 received at a first surface into flood light projected out of a second surface. The flood light projection out of the second surface of switchable diffuser 136a is generally identified by numeral 137 in FIG. 4.

Before discussing the lower image of FIG. 3 in operative detail, it should be noted that switchable diffuser 136 is designated by numeral 136a in the upper image to designate the "off" state (or, in other words, a diffuser/scatterer condition), and is designated by numeral 136b in the lower image to designate the "on" state (or, in other words, a transparent or substantially transparent condition). That is, switchable diffuser 136a (shaded) and 136b (not shaded) in FIG. 3, are the same switchable diffuser, just in different operating states based on the different electric field or voltage being applied (or not being applied, as the case may be), as between the first voltage condition and the second voltage condition.

As shown in the lower portion of FIG. 3, when a voltage source is controlled to deliver a second voltage (denoted by variable $V_2$ in the lower image of FIG. 3) to a switchable diffuser 136 (identified as 136b in the lower image), the molecular orientation of the switchable diffuser material may change such that the switchable diffuser is transparent or substantially transparent to the incoming light. This may be referred to as the "on" state. In some embodiments, the second voltage, $V_2$, may be about between 1 V and 50 V, wherein the "on" state actually corresponds to the voltage being turned "on" from the perspective of the switchable diffuser 136. It should be appreciated however, that the "on" state does not necessarily have to correspond to the voltage of a voltage source being turned on.

As noted above, it should be understood that the aforementioned "off" state does not necessarily have to correspond to the voltage of a voltage source being turned off, and that the "on" state does not necessarily have to correspond to the voltage of a voltage source being turned on. In some embodiments, the "on" state and the "off" state may be said to assume the opposite states as those discussed above. That is, the first voltage condition may achieve an "on" state such that the structured light emissions (e.g., dot projections) that are in coupled to switchable diffuser are allowed to pass through substantially unscattered by the molecular structure of the switchable diffuser, and the second voltage condition may achieve the "off" state such that the structured light emissions (e.g., dot projections) that are in coupled to switchable diffuser are scattered/diffused by the molecular structure of the switchable diffuser and out coupled from the switchable diffuser as flood light. Consequently, switchable diffuser under the first voltage condition (achieving the "on" state) may result in a structured light projection therefrom (e.g., dot projection in a uniform pattern), while switchable diffuser under the second voltage condition (achieving the "off" state) may result in a flood projection therefrom.

In some embodiments, the switchable diffuser is substantially transparent to the in coupled structured light emissions (e.g., dot projections) in its natural state or under a first voltage condition (e.g., where the applied voltage is about between 0 V and 1 V) and substantially scattering/diffusive to the in coupled structured light emissions (e.g., dot projections) in its unnatural state or under a second voltage condition (e.g., where the applied voltage is about between 1 V and 50 V). Either such scenario may be referred to as the "on" state or the "off" state, depending on convention desired.

In some embodiments the "on" state of the switchable diffuser 136 may be achieved where the second voltage is 0 V. In other embodiments, the "on" state of the switchable diffuser 136 may be achieved where the first voltage is any voltage that allows or causes the liquid crystals within the polymeric structure of switchable diffuser to maintain or achieve a molecular arrangement or orientation that causes the switchable diffuser to be transparent or substantially transparent to incoming light, thus allowing the in-coupled light from light projecting structure 134 and/or light source 132 to pass therethrough without substantial dispersion, diffusion, or other divergence that substantially disrupts the structured light character of the light—thereby permitting structured or random pattern of dot beams to be projected onto a surface of an object and reflected back to a ToF detector 170 (shown in FIGS. 1-2).

As shown in the lower image of FIG. 4, under the second voltage condition, light source 132 may continue to provide light that is in-coupled to light projecting structure 134. As above, the light projected from light projecting structure 134 continues to comprise structured light emissions (e.g., a plurality of dot projections). Such structured light emissions (e.g., dot projections 135) may be incident upon a first surface of switchable diffuser 136, or otherwise coupled into switchable diffuser 136. Under the second voltage condition, the structured light emissions (e.g., dot projections 135) that are in coupled to switchable diffuser 136 are not substantially scattered by the molecular structure of the switchable diffuser 136. Consequently, switchable diffuser 136 allows the dot light beams 135 received at a first surface to pass through and out of a second surface, continuing onward as narrow beam dot projections. The structured light emissions (e.g., dot projections) proceeding out of the second surface of switchable diffuser 136b are generally identified by numeral 138 in FIG. 4.

Although FIG. 4 illustrates (by way of example only) that the switchable diffuser 136 is positioned after the light projecting structure 134 (e.g., projection lens), the switchable diffuser 136 may also be arranged in other positions with respect to the elements of light projecting subsystem 130. For example, various positioning arrangements that may be implemented in accordance with the present disclosure are discussed in more detail with reference to U.S. application Ser. Nos. 16/259,812, and 16/268,493, as well as Chinese Application Nos. 201910035662.5 and 201910073808.5, which are incorporated herein by reference in their entirety.

In further embodiments, controller 140 may cause operation of the aforementioned elements to be synchronized based on one or more device operating capabilities or requirements, environmental conditions, default or user defined settings, or any other input. For example, if light sensor 172 is controlled to capture time-of-flight information during a given frame for a period of 1/60 seconds, the controller 140 may control switchable diffuser 136 to switch between an "off" state and an "on" state within the period of time that the image information is captured for a given frame. That is, for a given frame capture, controller 140 may effectuate a switch of the switchable diffuser 136 such that structured projections only, flood projections only, or a fusion of both structured and flood projections are generated and/or resolved (e.g., in time-multiplexed manner, as noted above) by the detector 172 during the period of light capture for the frame. In some instances, for example, controller 140 may regulate the state of switchable diffuser 136 (and ensure demultiplexing and demodulation of information received at ToF detector 170) to effect the projection of flood light initially to map out basic imagery within the field of view (e.g., generating lower depth resolution from the flood light), then segment the basic imagery obtained based on identified patches of the image that appear to be of substantially the same depth, followed by selective projections of flood light to generate higher depth resolution information that may be used to enhance the depth accuracy in one or more of the depth patches, and in some cases all of the depth patches. The foregoing provides one example of a fused ToF depth image that may be generated or otherwise enabled by systems and methods of the present disclosure.

In some embodiments, controller 140 may be configured to oscillate (or otherwise change) the electric field applied to the switchable diffuser to impose state transitions of the switchable diffuser at a rate that is between 2-100 times faster than the frame rate established for image capture. For example, if the frame rate in a given scenario is 20 frames per second, the controller 140 may be configured to change the electric field applied to the switchable diffuser to cause the switchable diffuser to change back and forth between a substantially transparent state and a substantially scattering state 100 times/second (e.g., 5 times faster than the frame rate). In some embodiments, controller 140 may be configured to oscillate the electric field applied to the switchable diffuser at a rate that is between greater than 100 times faster than the frame rate established for image capture.

Figure 5:
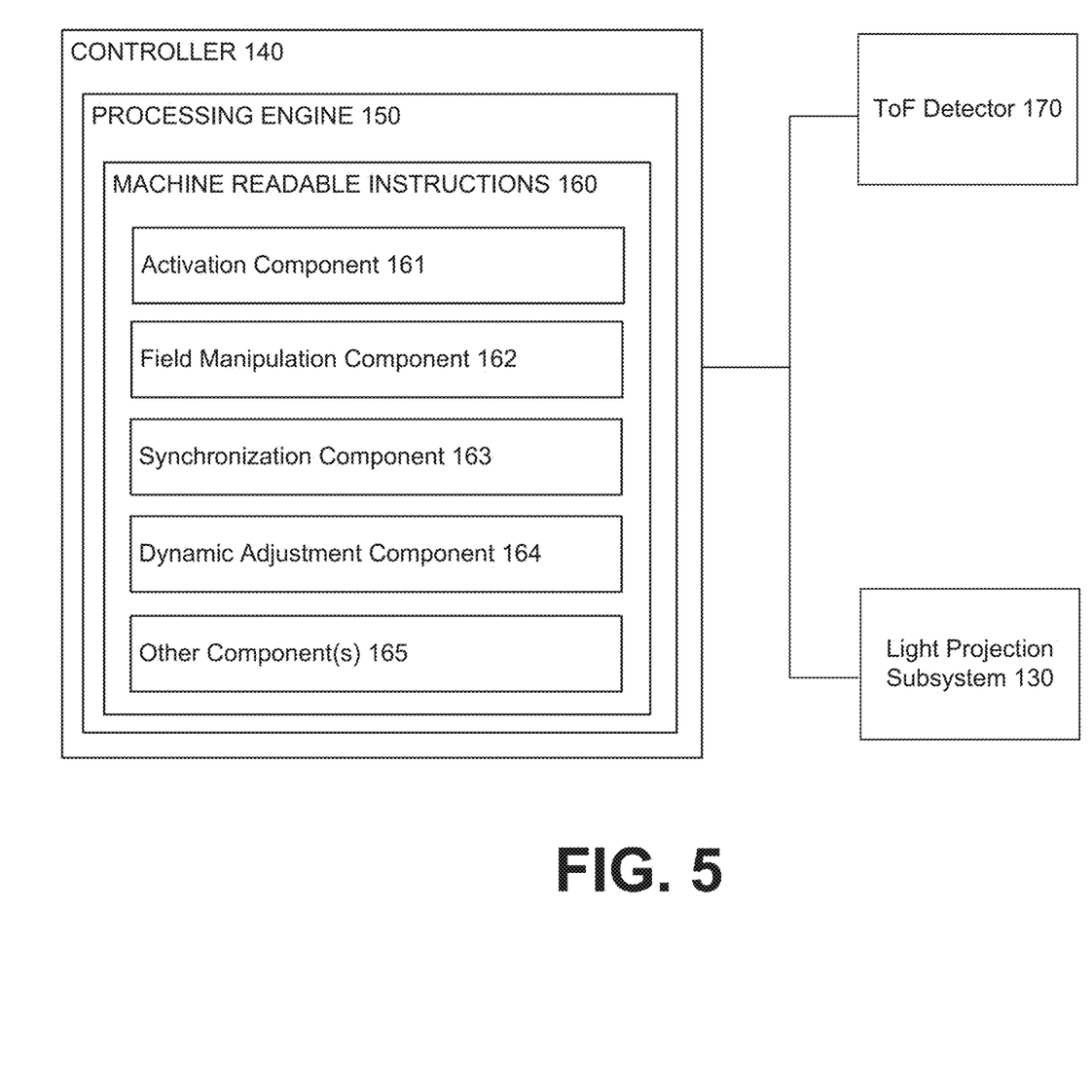
FIG. 5 illustrates an example architecture depicting various subcomponents of a controller that may be implemented in accordance with various embodiments of the present disclosure.

FIG. 5 illustrates an example architecture depicting various subcomponents of controller 140 that may, upon execution, enable one or more of the features disclosed herein in connection with one or more other elements of system 100 (or system 200), including any one or more elements of light projection subsystem 130 and ToF detector 170. As shown, controller 140 may be configured (or operatively coupled) with one or more processing engines 150, and one or more machine readable instructions 160 which, when executed by the one or more processing engines 150, cause one or more of the disclosed features to be effectuated. Machine readable instructions 160 may be stored on a machine readable medium. The machine readable instructions 160 may have machine readable code comprising an activation component 161, a field manipulation component 162, synchronization component 163, dynamic adjustment component 164, and/or one or more other components 165.

Activation component 161 may be configured to detect when use of imaging system 100/200 is desired, and to correspondingly cause the system 100/200 to activate one or more elements of light projection subsystem 130 and/or ToF detector 170. For example, if a user's mobile phone is equipped with system 100/200, and the user's input indicates a request for 3D facial recognition (or other 3D topology mapping requiring depth resolution), activation component 161 may identify the indication provided by the user, and cause system 100/200 to activate the light source 132 of light projection subsystem 130 and/or ToF detector 170. Activation component 161 may be further configured to determine an operation status of light projection subsystem 130 and/or ToF detector 170. If the operation status of light projection subsystem 130 and/or ToF detector 170 is satisfactory, activation component 161 may activate field manipulation component 162.

Field manipulation component 162 may be configured cause system to impose, modify, or adjust an electric field applied to a switchable diffuser 136 element of light projection subsystem 130. For example, field manipulation component 162 may cause controller 140 to apply, adjust or remove a voltage to/from switchable diffuser 136 from a voltage source to which the controller 140 is operatively coupled. By applying, adjusting or removing such electric fields, field manipulation component 162 may cause switchable diffuser 136 two switch back-and-forth between an "off" state (diffusion/scattering state) and an "on" state (transparent state). Field manipulation component 162 may be configured to time its operations in accordance with the operation of other elements of system 100, for example, ToF detector 170 and other components of controller 140. In so doing, field manipulation component 162 may draw on information determined, stored, or otherwise provided by synchronization component 163.

Synchronization component 163 may be configured to determine an operation speed or rate of ToF information capture being performed, or capable of being performed, by ToF detector 170 and/or controller 140 in connection with ToF detector 170. Additionally, synchronization component 163 may determine or control the timing of operation of such elements, and informed field manipulation component 162 of the same. For example, as noted above, if light sensor 172 is controlled to capture time-of-flight information for a period of $\frac{1}{60}$ second or less, synchronization component 163 may identify this operation capacity (based on detection or based on pre-determined/stored information) and may further provide a start and/or stop time to either or both of activation component 161 and field manipulation component 162. In other words, in some embodiments synchronization component 163 may be configured with a clock that can be used in connection with the operations of activation component 161 and field manipulation component 162 (or any other components of systems of the present disclosure), to synchronize functionality such that the desired performance may be achieved. The desired performance in a given situation may be pre-determined, or it may be dynamically adjustable given one or more other detectable conditions. The dynamically adjustable features of the presently disclosed technology may be enabled, in whole or in part, by a dynamic adjustment component 164.

Dynamic adjustment component 164 may be configured to detect one or more internal or external conditions or requests that call for an adjustment to any default or otherwise predetermined operation settings of system 100. Dynamic adjustment component 164 may be informed by one or more sensors or detection engines operating in connection with one or more other components 165. Examples of dynamic adjustment component 164 functionality may also include those detailed in U.S. application Ser. Nos. 16/259,812, and 16/268,493, as well as Chinese Application Nos. 201910035662.5 and 201910073808.5, which are incorporated herein by reference in their entirety.

As noted previously, the controller 140 may control switchable diffuser 136 to switch between an "off" state and an "on" state within the period of time that the image information is captured for a given frame. It is also noted here that controller 140 (e.g., via field manipulation component 162) may cause switchable diffuser 136 to switch between an off state and an on state multiple times during a given capture period. That is, for a given capture period, controller 140 may effectuate a switch of the switchable diffuser 136 such that both dot projection reflections and flood projection reflections are received (in time-division multiplexed manner, as noted above) by the ToF detector 170 during the period of light capture for a given capture period. In some embodiments, controller 140 may be configured to oscillate (or otherwise change) the electric field applied to the switchable diffuser at a rate that is between 2-100 times faster than the frame rate established for the given capture period. In some embodiments, controller 140 may be configured to oscillate the electric field applied to the switchable diffuser at a rate that is between greater than 100 times faster than the frame rate established for image capture.

Synchronization component 163 may operate to inform other elements of the system as to the timing of light projections, thereby informing the processing of light information received by the light sensor 172 of ToF detector 170 such that the system may discriminate or otherwise distinguish between light information that is associated with reflected floodlight, and light information that is associated with reflected structured light projections, and adjust other operations accordingly. In other words, synchronization component 163 may provide multiplexing functionality in connection with received light information. Thus, for example, synchronization component 163 may enable ToF detector 170 to capture structured light reflections during time periods of structured light detection, and another imaging detector (e.g., a visible light wavelength camera) to capture light reflections during time periods of flood light projection.

As will be appreciated by those of skill in the art, although shown in FIG. 5 as being embodied as machine-readable instructions 160, any one or more of activation component 161, field manipulation component 162, synchronization component 163, dynamic adjustment component 164, and/or other components 165 may be implemented in either hardware or software or both.

The ToF detection features of the present disclosure may apply the time-of-flight principle to particular use cases as necessary to achieve a desired result. The pulsed time-of-flight principle recognizes that the time light needs to travel from a light source to an object and back to a detector changes depending on how far away the object is from the light source and/or ToF detector—i.e., the further the distance the light has to travel through space, the longer amount of time it will take for the light to reach the ToF detector. For ToF detection to operate properly, both the light source and the ToF detector must be synchronized such that distances can be extracted and calculated from the time differences detected. In particular, the timing details of the light pulse generated by the light source and the timing details of the light received back at the ToF detector should be tightly controlled and/or monitored. The resolution of ToF based images enhances with enhanced monitoring and/or control of timing, and with enhanced signal-to-noise ratios as enabled by the present disclosure.

Persons of ordinary skill in the art will appreciate that all of the elements of controller 140 as discussed with reference to FIG. 5 may be extended to embodiments employing other, non-ToF types of detectors as well. For example, in embodiments where the ToF detector 170 of the present disclosure are deployed in combination with, for example, an IR detector, then synchronization component 163 may be configured to extend its synchronization functionalities to such other detectors as well. For example, the enhanced ToF depth resolution systems of the present disclosure may be deployed in combined systems such as those described with reference to FIG. 7 of U.S. application Ser. No. 16/268,493 and Chinese Application No. 201910073808.5, which are incorporated by reference herein in their entirety. As such, system embodiments in accordance with system 500, or variations thereof, may enable the capture of enhanced 3D ToF photos/image information in synchronization with 2D IR dot photos/image information. Providing embodiments with such a fusion mode of operation enables embodiments of the present disclosure to achieve both (1) the benefits of higher depth resolution from dot projections, and (2) higher x-y resolution from flood projections, among other advantages.

Figure 6:
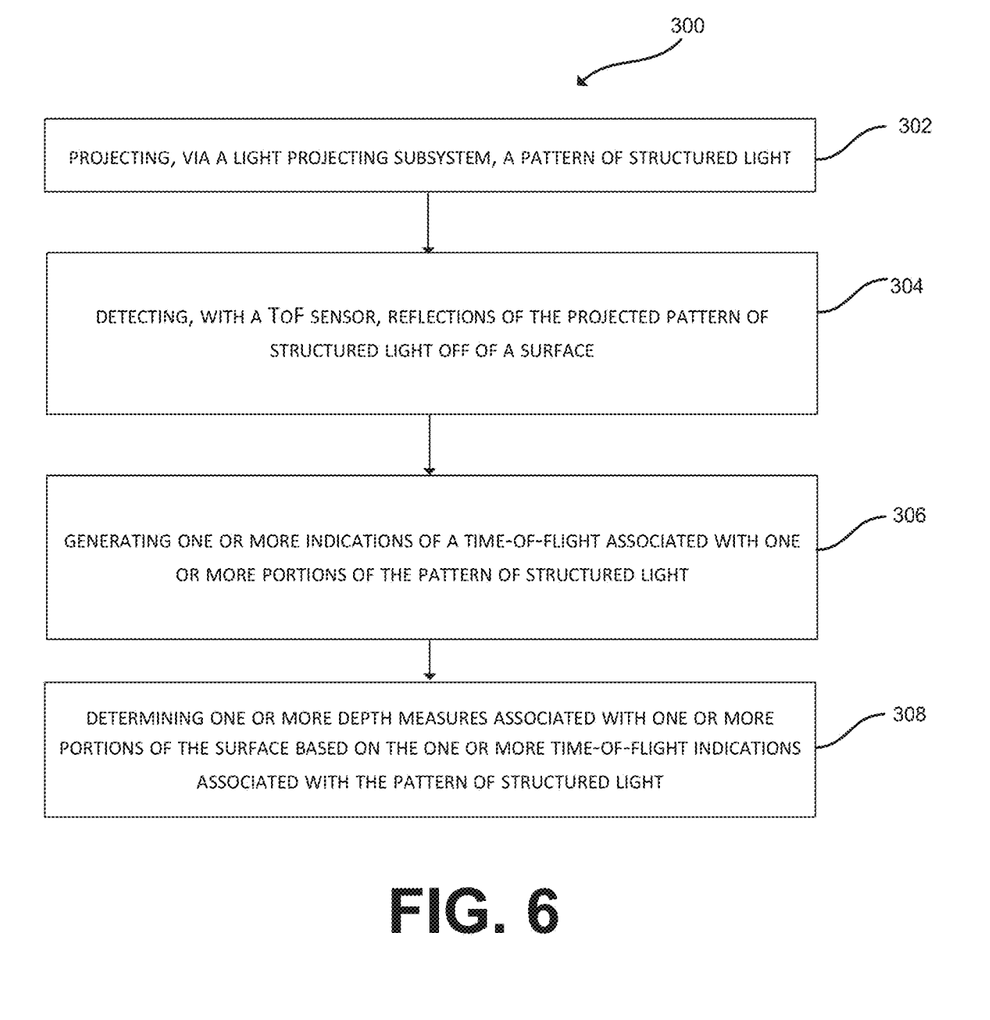
FIG. 6 is a process flow chart illustrating an example method that may be implemented in accordance with one or more embodiments of the present disclosure.

FIG. 6 illustrates a process flow diagram depicting a method that may be implemented in accordance with one or more embodiments of the present disclosure. As shown, at operation 302 method 300 comprises projecting, via a light projecting subsystem, a pattern of structured light. At operation 304 method 300 comprises detecting, with a ToF detector, reflections of the projected pattern of structured light off of a surface. At operation 306 method 300 comprises generating one or more indications of a time-of-flight associated with one or more portions of the pattern of structured light. At operation 308 method 300 comprises determining one or more depth measures associated with one or more portions of the surface based on the one or more time-of-flight indications associated with the pattern of structured light.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system, comprising:
   a light projecting subsystem configured to project a pattern of structured light;
   a time-of-fight (ToF) sensor configured to detect reflections of the projected pattern of structured light off of a surface, and provide one or more time-of-flight indications associated with one or more portions of the pattern of structured light; and
   a processing engine electrically coupled with a non-transitory computer readable medium having machine readable instructions stored thereon, which, when executed by the processing engine, cause the system to:
   determine one or more depth measures associated with one or more portions of the surface based on the one or more time-of-flight indications associated with the pattern of structured light; and
   select, among a plurality of patterns of structured light, a pattern of structured light for projection, wherein the selection is based on an estimated distance between the light projecting subsystem and the surface.

2. The system of claim 1, wherein the light projecting subsystem comprises a light source and a light projecting structure.

3. The system of claim 1, wherein the light projecting subsystem comprises a switchable diffuser, and wherein the light projecting subsystem is configured to project flood light when the switchable diffuser is in a first state and project structured light when the switchable diffuser is in a second state.

4. The system of claim 3, wherein the ToF sensor is further configured to detect reflections of projected flood light off of the surface, and to provide one or more time-of-flight indications associated with one or more portions the projected flood light; and
   wherein the non-transitory computer readable medium further comprises machine readable instructions stored thereon which, when executed by the processing engine, cause the system to: determine one or more depth measures associated with one or more portions of the surface based on the one or more time-of-flight indications associated the projected flood light.

5. The system of claim 3, wherein the switchable diffuser is configured to change from a first state to a second state responsive to a control source being changed from a first condition to a second condition.

6. The system of claim 4, wherein the time-of-flight measure is based on both a structured light reflection and a flood light reflection.

7. The system of claim 1, wherein the pattern comprises one or more of a dot array pattern, a stripe pattern, and a checker board pattern.

8. The system of claim 1, further comprising machine readable instructions stored on the non-transitory computer readable medium, which, when executed by the processing engine, cause the system to:
   modulate the structured light in accordance with one or more of an amplitude modulation, frequency modulation, phase modulation, and pulse modulation.

9. The system of claim 8, further comprising machine readable instructions stored on the non-transitory computer readable medium which, when executed by the processing engine, cause the system to:
   select, among a plurality of optional modulation schemes, a modulation scheme for modulating the structured light, the selection based on an estimated distance the surface is from the light projecting subsystem.

10. A method, comprising:
    projecting, with a light projecting subsystem, a pattern of structured light;
    detecting, with a time-of-fight (ToF) sensor, reflections of the projected pattern of structured light off of a surface;
    generating one or more time-of-flight indications associated with one or more portions of the pattern of structured light; and
    determining one or more depth measures associated with one or more portions of the surface based on the one or more time-of-flight indications associated with the pattern of structured light; and
    selecting, among a plurality of patterns of structured light, a pattern of structured light for projection, wherein the selection is based on an estimated distance between the light projecting subsystem and the surface.

11. The method of claim 10, wherein the light projecting subsystem comprises a light source and a light projecting structure.

12. The method of claim 10, wherein the light projecting subsystem comprises a switchable diffuser, and wherein the light projecting subsystem is configured to project flood light when the switchable diffuser is in a first state and project structured light when the switchable diffuser is in a second state.

13. The method of claim 12, wherein the ToF sensor is further configured to detect reflections of projected flood light off of the surface, and to provide one or more time-of-flight indications associated with one or more portions the projected flood light.

14. The method of claim 12, further comprising:
    determining one or more depth measures associated with one or more portions of the surface based on the one or more time-of-flight indications associated the projected flood light.

15. The method of claim 13, wherein the switchable diffuser is configured to change from a first state to a second state responsive to a control source being changed from a first condition to a second condition.

16. The method of claim 14, wherein the time-of-flight measure is based on both a projected structured light reflection and a projected flood light reflection.

17. The method of claim 10, wherein the pattern comprises one or more of a dot array pattern, a stripe pattern, and a checkered pattern.

18. The method of claim 10, further comprising: modulating the structured light in accordance with one or more of an amplitude modulation, frequency modulation, phase modulation, and pulse modulation.

19. The method of claim 18, further comprising: selecting, among a plurality of optional modulation schemes, a modulation scheme for modulating the structured light, the selection based on an estimated distance the surface is from the light projecting subsystem.

20. A non-transitory computer readable medium storing instructions which, when executed by a processor, cause an apparatus to:
    project, with a light projecting subsystem, a pattern of structured light;
    detect, with a time-of-fight (ToF) sensor, reflections of the projected pattern of structured light off of a surface;
    generate one or more time-of-flight indications associated with one or more portions of the pattern of structured light; and
    determine one or more depth measures associated with one or more portions of the surface based on the one or more time-of-flight indications associated with the pattern of structured light; and select, among a plurality of patterns of structured light, a pattern of structured light for projection, wherein the selection is based on an estimated distance between the light projecting subsystem and the surface.

21. The non-transitory computer readable medium of claim 20, wherein the light projecting subsystem comprises a light source and a light projecting structure.

22. The non-transitory computer readable medium of claim 20, wherein the light projecting subsystem comprises a switchable diffuser, and wherein the light projecting subsystem is configured to project flood light when the switchable diffuser is in a first state and project structured light when the switchable diffuser is in a second state.

23. The non-transitory computer readable medium of claim 22, wherein the ToF sensor is further configured to detect reflections of projected flood light off of the surface, and to provide one or more time-of-flight indications associated with one or more portions the projected flood light.

24. The non-transitory computer readable medium of claim 22, further storing instructions which, when executed by the processor, cause the apparatus to:

determining one or more depth measures associated with one or more portions of the surface based on the one or more time-of-flight indications associated the projected flood light.

25. The non-transitory computer readable medium of claim 23, wherein the switchable diffuser is configured to change from a first state to a second state responsive to a control source being changed from a first condition to a second condition.

26. The non-transitory computer readable medium of claim 24, wherein the time-of-flight measure is based on both a projected structured light reflection and a projected flood light reflection.

27. The non-transitory computer readable medium of claim 20, wherein the pattern comprises one or more of a dot array pattern, a stripe pattern, and a checkered pattern.

* * * * *